United States Patent [19]

Teeple, Jr. et al.

[11] 3,744,639
[45] July 10, 1973

[54] PORTABLE WATER PURIFIER

[76] Inventors: Gifford H. Teeple, Jr., 720 26th St., Manhattan Beach, Calif. 90266; James W. Welsh, 776 North First Avenue, Logan, Utah 84321

[22] Filed: Mar. 16, 1971

[21] Appl. No.: 124,714

[52] U.S. Cl. ........................... 210/265, 210/282
[51] Int. Cl. ........................................ B01d 23/00
[58] Field of Search .................... 210/94, 265, 282

[56] References Cited
UNITED STATES PATENTS

| | | | |
|---|---|---|---|
| 3,224,586 | 12/1965 | Wade | 210/282 |
| 3,223,619 | 12/1965 | Calmon et al. | 210/282 X |
| 3,327,859 | 6/1967 | Pall | 210/282 X |
| 590,020 | 9/1897 | Myers | 210/265 |
| 466,809 | 1/1892 | Stone | 210/265 X |

Primary Examiner—Samih N. Zaharna
Assistant Examiner—Richard W. Burks
Attorney—White, Haefliger & Bachand

[57] ABSTRACT

A filter assembly comprises a substantially flat, foldable container having a liquid inlet and a liquid outlet; and, particulate filtering media in the path of liquid flow in the container between the inlet and outlet. The container may define an elongated duct, with flexible flow regulator means therein to control flow through multiple compartments.

9 Claims, 11 Drawing Figures

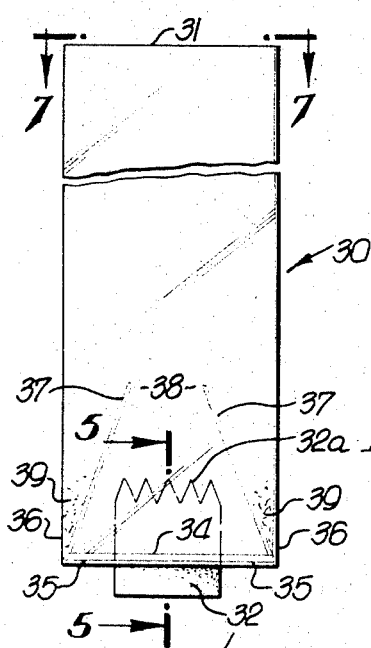
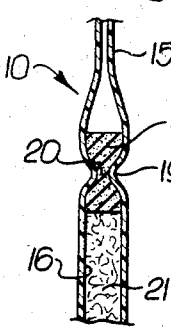
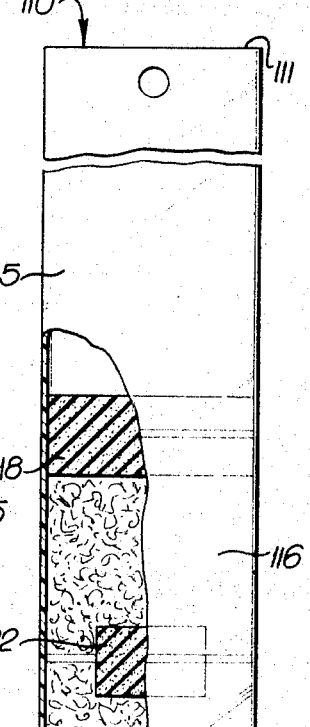
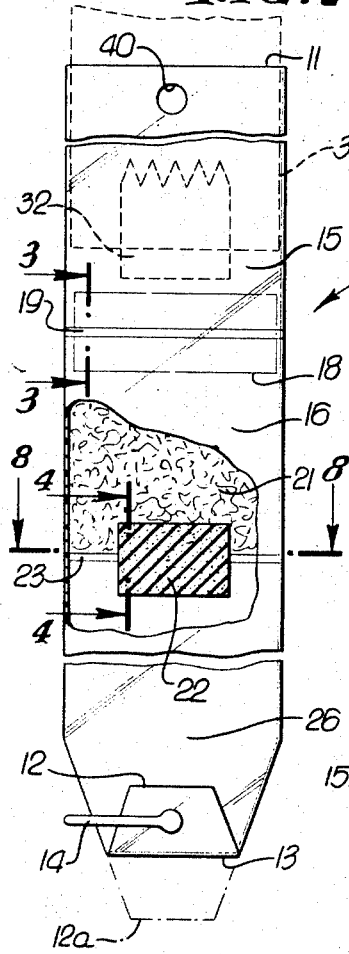
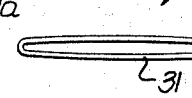
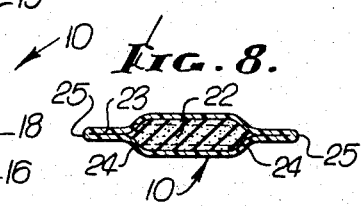
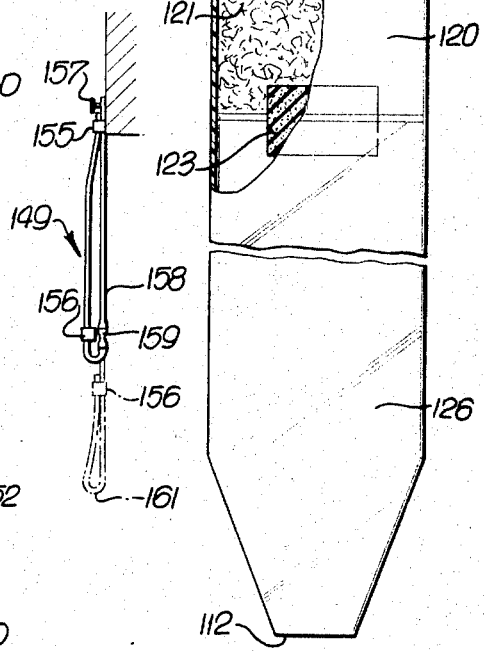
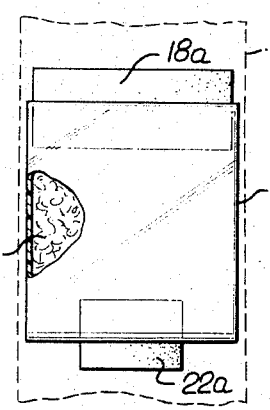

PORTABLE WATER PURIFIER

BACKGROUND OF THE INVENTION

This invention relates generally to filtering apparatus, and more particularly concerns the provision of portable and foldable water purification equipment.

Efficient water purification involves removal from raw water of suspended material and sediment, harmful bacteria and heavy metal ions. While devices have been built in the past to perform these functions, no prior device of which we are aware and capable of such performance has embodied the characteristics of portability, foldability and low cost construction as are found in the present apparatus.

SUMMARY OF THE INVENTION

It is a major object of the invention to provide an efficient water purifier which will remove from non-salt water sources objectionable taste and odor, and other water borne contaminants. Another object is to provide a purifier unit of such light weight and compactness as to be easily carried, as for example, by campers hikers, fisherman, hunters, sportsmen of all types, and all those who are not near a source of good, pure potable water.

An added object is to provide a unit so simple in construction as to require only gravity as a working feed-force and/or a slight mechanically applied pressure to effect filter operation.

Basically, the filter assembly includes, in combination, a substantially flat, foldable container having a liquid inlet and a liquid outlet; and particulate filtering media in the path of liquid flow in the container between the inlet and outlet. For example, the container may consist of sheet plastic and may be easily folded to be stored in a hiker's pocket or a small receptacle carried in a hiker's pack. To be used, the container may be unfolded, filled with water to be purified, and hung on a tree or the like to induce gravity effected filtering, as will be described. Additional features of the invention include the provision of a flexible, elongated filter container forming, in sequence, a first compartment in which liquid borne sediment is trapped and having a restricted outlet; a second compartment containing filter media to receive liquid from the first compartment and also having a restricted outlet; and an additional compartment to receive, store and controllably release liquid draining from the second compartment. Further, a flexible flow regulator, as for example a flexible porous body, or bodies, may be located at the restricted outlet or outlets between compartments, as will be seen; & the filter media may consist of activated charcoal granules in one zone and deionizing resin particles in a second zone. Also, the container may advantageously consist of at least two plastic ducts respectively forming the first and second compartments described above, one duct insertible endwise into the other, for purposes as will appear. A filter media sub-pack may also be provided.

These and other objects and advantages of the invention, as well as the details of an illustrative embodiment, will be more fully understood from the following description and drawings, in which:

DRAWING DESCRIPTION

FIG. 1 is an elevation showing a first flexible container;

FIG. 2 is an elevation showing a second flexible container in which the first is insertible;

FIGS. 3 and 4 are horizontal sections taken on lines 3—3 and 4—4 of FIG. 2;

FIG. 5 is a vertical section taken on line 5—5 of FIG. 1;

FIG. 6 is an elevation showing the FIG. 2 container in partially folded condition;

FIG. 7 is a plan view taken on line 7—7 of FIG. 1;

FIG. 8 is a section taken on line 8—8 of FIG. 2;

FIG. 9 is an elevation showing another modified container;

FIG. 10 is an elevation showing another modified construction; and

FIG. 11 is a side elevation showing a further modification.

DETAILED DESCRIPTION

Referring first to FIG. 2, a flattened (but water expansible) container 10 is shown to have a top liquid inlet 11 and a bottom liquid outlet 12. The container material may, for example, consist of sheet polyethylene or other plastic and may be clear or sufficiently translucent as to permit viewing of liquid such as water being filtered. The bottom outlet portion of the container may be folded back at 13 and and retained as by a U-shaped spring clip 14 to block water discharge until desired.

Water filled or received into the upper compartment 15 of the container expands same into rounded tubular configuration and flows to the intermediate compartment 16 via particle trapping means such as a porous plastic sponge or other porous material. The trap 18 extends transversely across the interior of the tubular container and may be peripherally sealed to the latter as by heat sealing or other banding technique at the band locus 19. Preferably, the sponge is restricted or squeezed at 20 inwardly of the seal band 19, so that some flow regulation occurs.

Water thereby is caused to drain into compartment 16 at a controlled rate consistent with desired drainage through loose particulate filtering media 21 in compartment 16 in the path of such flow. That media may, for example, consist of activated charcoal which may be pre-treated for killing bacteria. Such charcoal particles may substantially fill compartment 16, and may be retained endwise therein by the upper sponge trap 18, and also by a lower sponge trap 22.

The lower sponge acts as a flow regulator or restriction means, and may extend only part way across the full interior width of the container 10. As shown, the sponge is peripherally sealed to the container along band 23, as described above at 19. Also, the container walls are sealed at locations 23 between the lateral ends 24 of the sponge and the edges 25 of the container, as appears in FIG. 8. Accordingly, water is retained in second compartment 16 for sufficient time for the desired bacteriacidal effect, treated water then exiting via the flow regulator into a third compartment 26. The latter retains and stores water for ultimate discharge via outlet 12 when unfolded downward to 12a position.

Prior to filling into compartment 15, the water may be pre-treated to remove heavier suspended organic material and sediment, prior to ultimate removal of finer material of this nature as by means of sponge 18. In this way, the useful life of the latter sponge may be extended. For this purpose, a second plastic duct may be provided, as for example indicated at 30 in FIG. 1. The second duct has an upper inlet 31 and a lower outlet defined by a filter 32 in the form of a plastic or other porous body such as a sponge similar to sponge 22. The container 30 is interiorly peripherally sealed to sponge 32 along band 34, and the lower end of the container is sealed at 35 between the sponge and edges 36. In addition, the flattened container sides may be sealed along bands 37 tapering upwardly toward an interiorly open neck region 38. As a result, sediment tends to be gravity-trapped in interior pockets 39 between bands 37 and edges 36, and water draining to sponge 32 via neck 38 is correspondingly partially cleared of sediment, to prolong the unclogged useful life of sponge 32.

The container sleeve 30 may be loosely received in container duct 10, as indicated at 30a in FIG. 2 to provide a combination filtering action, and when sleeve 30 has been emptied into compartment 15, sleeve 30 may be removed. Thereafter, container 10 may be hung up as via hanger opening 40, for completion of filtering action. For progressive filtering action, the porosity of sponges 32, 18 and 22 may increase, successively, within a range of from about 50 to 100 pores per inch of dimension; thus, sponges 32, 18 and 22 (which may for example, consist of polyurethane) may respectively have porosities of about 60, 80 and 100, pores per inch, and consist of "Scott" industrial foam. Further, the foam may be treated to have anti-bacterial and anti-fungus properties, DuPont "Thyrin" being added to the unexpanded material that forms the sponge upon expansion, for this purpose.

FIG. 6 shows a typical folding of the FIG. 2 container, as accommodated by bands 19 and 23, to provide a compact filter well adapted to use by a sportsman or camper.

The FIG. 9 modification is the same as the FIG. 2 device in that sponges 118 and 122, and compartments 115 and 116 correspond to elements 18, 22, 15 and 16 of FIG. 2; however, another compartment 120 is formed by the tubular, flattened plastic container 110, and directly below charcoal compartment 116. Compartment 120 contains de-ionizing resin particles 121, trapped from escape by sponge 123 at the lower outlet of compartment 120. Those particles act to remove heaby metal ions from the water, and may consist of cationic or anionic material obtainable, for example, from Rohm and Haas Company. Tests upon water treated by the described device indicate extreme purity.

FIG. 10 illustrates a pre-packaged unit comprising an upper sponge 18a corresponding to sponge 18; a lower sponge 22a corresponding to sponge 22, a polyethylene or other clear plastic package 150 (corresponding to that section of container 10 between sponges 18 and 22), and treating agent 151 in the pack. The package 150 is sealed off about the sponges and sized to be slipped into an elongated container 152 and secured therein as by heat sealing, for ease of fabrication.

FIG. 11 shows a container 149 of FIG. 2 type excepting that it includes upper and lower securing means such as loops or bands 155 and 156. When the container is hung as shown at 157, water tends to stand in sediment trap section 158 above the first sponge 159 (corresponding to sponge 32); at this time, the container 149 is folded and its lower end held in upper loop 155. Thereafter, the container lower end is released and attached to the lower loop 156, to allow the lower portions of the filter to operate by gravity action, numeral 161 indicating this position.

Referring back to FIG. 1, any of the sponges may have its water inlet end area increased, as by serrating that end, as for example is illustrated by serrations 32a on sponge 32.

We claim:
1. In a filter assembly, the combination comprising
   a. an elongated upright substantially flat, foldable container having a liquid inlet and a liquid outlet, said container consisting of sheet plastic defining a first duct,
   b. particulate filtering media in the path of liquid flow in the first duct between said inlet and outlet,
   c. there being a manually manipulable closure carried by the first duct proximate said outlet to control drainage of liquid from the container, the lowermost portion of the first duct tapering downwardly toward said outlet which is directed downwardly at the lower end of the container, and said closure located at said tapered portion of the first duct, and
   d. a second duct consisting of foldable sheet plastic material, the second duct having liquid inlet and outlet end portions, a porous filter carried within the second duct and at said outlet end portion thereof, the second duct having opposite flat sides which are joined together to define a sediment trap within the lowermost portion of the second duct and proximate to but outside the porous filter and the second duct outlet end portion being removably telescopically received in the first duct above the level of said filtering media.

2. The combination of claim 1 wherein the sheet plastic ducts are adapted to be expanded by water flowing therethrough, there being means in the first duct to restrict said flow.

3. The combination of claim 1 including a flexible flow regulator in the first duct in said liquid flow path.

4. The combination of claim 3 wherein said regulator consists of a flexible porous body.

5. The combination of claim 4 wherein said body is downstream of said filtering media, and including a second flexible porous body upstream of said media, said bodies blocking escape of the media from the interior of the first duct.

6. The combination of claim 5 wherein said media consists of activated charcoal granules.

7. The combination of claim 1 wherein said media consists of activated charcoal granules in one zone in said path, and de-ionizing resin particles in another zone in said path.

8. The combination of claim 7 including flexible porous plastic sponge means retained in the first duct to block escape of said media from said zones.

9. The combination of claim 4 wherein said regulator body has an irregular entrance end to substantially increase the particle entrapping surface area.

* * * * *